(12) United States Patent
Iselt

(10) Patent No.: US 6,914,888 B1
(45) Date of Patent: Jul. 5, 2005

(54) RADIO DEVICE WITH REMOTE CONTROL

(75) Inventor: Peter Iselt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 09/623,024

(22) PCT Filed: Feb. 18, 1999

(86) PCT No.: PCT/EP99/01055

§ 371 (c)(1),
(2), (4) Date: Oct. 18, 2000

(87) PCT Pub. No.: WO99/44350

PCT Pub. Date: Sep. 2, 1999

(30) Foreign Application Priority Data

Feb. 25, 1998 (DE) .......................... 198 07 928

(51) Int. Cl.$^7$ .................. H04L 12/28; H04L 12/66; H04B 7/00; G08B 5/22

(52) U.S. Cl. .................. 370/310; 370/463; 340/825.36; 455/68

(58) Field of Search .................. 370/310–349, 370/463–524; 340/825.36, 825.67, 825.69, 825.72, 825.24, 825.25, 425, 426, 438; 455/68–70, 466, 419, 423, 425; 714/708, 746

(56) References Cited

U.S. PATENT DOCUMENTS

| | | | | |
|---|---|---|---|---|
| 4,001,772 A | * | 1/1977 | Powell | 340/825.75 |
| 4,081,747 A | * | 3/1978 | Meyerle | 455/68 |
| 4,555,806 A | * | 11/1985 | Lange et al. | 714/708 |
| 4,764,981 A | * | 8/1988 | Myzahara et al. | 398/33 |
| 4,870,697 A | * | 9/1989 | Weber | 455/70 |
| 5,077,741 A | * | 12/1991 | Kotzin | 714/746 |
| 5,173,795 A | * | 12/1992 | Branan, Jr. et al. | 398/107 |
| 5,455,570 A | * | 10/1995 | Cook et al. | 340/825.22 |
| 5,559,794 A | * | 9/1996 | Willis et al. | 370/463 |
| 5,657,005 A | * | 8/1997 | Seebeck et al. | 340/825.72 |
| 5,671,267 A | * | 9/1997 | August et al. | 455/420 |
| 5,898,384 A | * | 4/1999 | Alt et al. | 340/825.36 |
| 6,002,450 A | * | 12/1999 | Darbee et al. | 348/734 |
| 6,088,588 A | * | 7/2000 | Osborne | 455/425 |
| 6,100,792 A | * | 8/2000 | Ogino et al. | 340/426 |
| 6,127,941 A | * | 10/2000 | Van Ryzin | 340/825.69 |
| 6,211,782 B1 | * | 4/2001 | Sandelman et al. | 340/506 |
| 6,243,022 B1 | * | 6/2001 | Furukawa | 340/825.72 |
| 6,278,499 B1 | * | 8/2001 | Darbee et al. | 348/734 |
| 6,281,790 B1 | * | 8/2001 | Kimmel et al. | 340/506 |
| 6,452,483 B2 | * | 9/2002 | Chen et al. | 340/425.5 |
| 6,563,430 B1 | * | 5/2003 | Kemink et al. | 340/825.49 |
| 6,594,470 B1 | * | 7/2003 | Barnes et al. | 455/67.7 |
| 6,622,925 B2 | * | 9/2003 | Carner et al. | 236/46 |
| 6,642,852 B2 | * | 11/2003 | Dresti et al. | 340/825.72 |
| 6,697,962 B1 | * | 2/2004 | McCrory et al. | 714/27 |

FOREIGN PATENT DOCUMENTS

| | | |
|---|---|---|
| DE | A1-7208290 | 9/1993 |
| DE | C1-4237395 | 2/1994 |
| DE | A1-19521453 | 12/1996 |
| EP | A2383277 | 8/1990 |
| EP | A1669746 | 8/1995 |
| EP | A2800303 | 10/1997 |

* cited by examiner

Primary Examiner—Man U. Phan
(74) Attorney, Agent, or Firm—Birch, Stewart, Kolasch & Birch, LLP

(57) ABSTRACT

A radio device with a plurality of adjustable transmitting and receiving functions is provided. According to the invention, the operating functions can be remotely controlled and remotely monitored via a remote control device. To this end, the remote control device is connected via a radio relay to an interface of the radio device, to which additional protective measure for securing a fault-free transmission of the operating functions and information are assigned. In addition, a device is provided on the remote control device for the input and output of the information to be transmitted with the radio device.

14 Claims, 1 Drawing Sheet

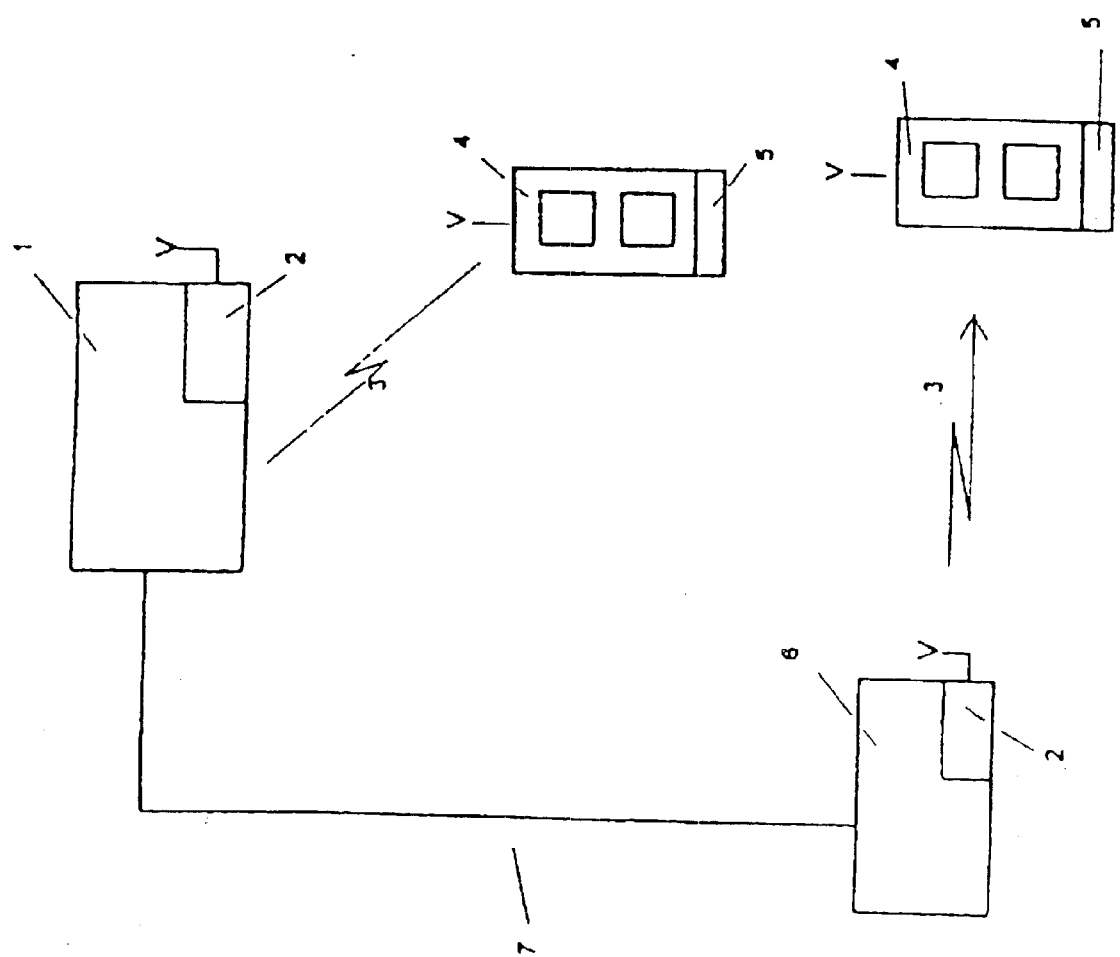

RADIO DEVICE WITH REMOTE CONTROL

This application is the national phase under 35 U.S.C. § 371 of PCT International Application No. PCT/EP99/01055 which has an International filing date of Feb. 18, 1999, which designated the United States of America.

BACKGROUND OF THE INVENTION

1. Field of the Invention

The present invention relates to a radio device with a plurality of adjustable transmitting and receiving functions suitable for transmitting information in a complex wireless transmission system, e.g., in the shortwave range.

2. Description of the Background Art

It is known that stationary radio devices or radio devices installed in motor vehicles can be operated by using remote control devices positioned locally a few meters away or at a greater distance, whereby the status of these radio devices can be monitored and transmissions/reception information can be transmitted by these remote control devices. Therefore, a suitable interface for a cable connection between a radio device and a remote control device is provided on the radio device.

There is an increasing demand for free mobility of the user in space or over land without being tied to the radio device by cables or the like. This demand is encountered in particular with highly mobile applications, for example, tactical military campaigns or other spontaneous actions such as rescue and emergency actions.

In the field of telephones, it is known that with so-called cordless telephones, for example, a hand-held device can be connected by wireless link to a mobile base unit (German Patent No. 4,237,395). Not only speech information but also program parameters for the base unit can be transmitted over these wireless links. Thus, for example, control commands can be transmitted to an electrical appliance such as a washing machine, or status information can be obtained from such an electric appliance by providing the appliance with such a transmitting and receiving device connected to a central telephone system (European Patent No. 800,303). However, this arrangement, which was developed for telephone systems, is unable to meet the high demands made of radio devices having a plurality of complex operating functions, especially since information must also be transmitted with the radio devices at the same time.

SUMMARY OF THE INVENTION

It is therefore an object of the present invention to provide a system with which the above-mentioned demand for free mobility of the user can also be met with such wireless transmission systems where high demands are made of the operating functions.

According to the invention, a wireless link is used for transmitting the operating functions as well as transmitting information between a remote control device and the actual radio device. This wireless link also has appropriate protective measures to ensure error-free transmission. Thus, such a radio device which has a plurality of complex operating functions and is used for information transmission in a complex wireless transmission system such as a shortwave transmission system can also be remotely controlled and remotely monitored by the user, while the user can nevertheless move freely in space or over land.

With the system according to the invention, the mobile remote control device is connected directly to the radio device instead of being connected by way of an intermediate central telephone exchange, as is the case with the known cordless telephone systems (European Patent No. 800,303), so this system is also extremely reliable in operation and cannot be paralyzed by failure of the central exchange.

The additional protective measures in wireless transmission ensure that unauthorized persons cannot intervene in the operating and information transmission system. The measure according to this invention is suitable for transmitting speech as well as other information, possibly even in a time-division multiplex method. With the radio device according to this invention, the actual complex devices for setting the transmission and reception functions and for establishing the connection remain in the actual radio device, and only the operating and monitoring commands together with the speech information or data information are exchanged over the remote control wireless link.

With respect to the choice of the transmission frequency, the power, the coding (if used) and the data rate, the remote control wireless link is designed to permit secure transmission over a distance of several hundred meters, so that the security of the transmission is not significantly inferior to that required for the system as a whole. This is achieved, for example, by using a suitable power management method for the wireless link either optionally or simultaneously, using a secure transmission protocol such as ARQ for information transmission or using a band spread. Encoding is also possible on the remote control wireless link to protect the control data, monitoring data and information data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing, which is given by way of illustration only, and thus, is not limitive of the present invention, and wherein the single FIGURE illustrates a block diagram of a preferred embodiment of the present invention.

DETAILED DESCRIPTION

The FIGURE shows a conventional stationary or semi-mobile radio device 1 which has a plurality of complex functions and is suitable for transmitting information in a complex wireless transmission system, e.g., a shortwave transmission system. An interface 2 for a wireless connection over a remote control wireless link 3 is provided on radio device 1; through which radio device 1 has a wireless connection to a locally positioned remote control device 4 over the wireless link 3. The transmission frequency of this wireless link 3 is adjusted to the operational scenario and may be selected between a shortwave connection and an optical light (infrared) connection. The remote control device 4, which can be hand-held, is battery powered, has a display field for the operating functions of radio device 1 and a corresponding operating field with which the user can set the individual operating functions of the radio device. In addition, a status display of the radio device in the display field is also possible. In addition, an interface 5 for input and output of the information to be transmitted over the radio device is also provided, the information being, for example, speech or other digital data. Thus, not only is the locally positioned radio device 1 operated and monitored over wireless link 3 but also the actual transmission of information to the remote control device 4 takes place over this wireless link.

Additional protective measures to ensure error-free transmission of operating data and information data are also provided on wireless link 3. Wireless link 3 is equipped with suitable channel coding, for example, and data transmission is handled according to a known transmission protocol. In addition, measures for encoding and decoding the transmitted data may be provided to prevent unauthorized persons from penetrating the transmission link. In addition, measures to protect against outside interference may be provided, e.g., through a suitable signal spread (use of a suitable method of sudden frequency change or other coding measures).

If radio device 1 already has a remote controller 6, which is connected by a cable 7 to the radio device 1, a suitable interface 2 may also be provided on the remote controller 6, so that a wireless remote control link 3 to the locally positioned remote control device 4 can be established, and again in this case, input and output of information to be transmitted over radio device 1 may also be provided by way of an interface 5. Thus, not only remote control data and remote monitoring data but also information can be transmitted over wireless link 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A radio device for transmitting and receiving in a complex wireless transmission system, that the radio device comprising:

an integrated remote control interface that is connected by a wireless link to a mobile remote control device through which operating functions of the radio device can be remotely controlled and through which operating states of the radio device can be remotely monitored, wherein the integrated remote control interface transmits the operating states and additional data to the mobile remote control device and receives the operating functions and the additional data from the mobile remote control device, and wherein the wireless link has additional protective measures to ensure error-free transmission of the operating functions, the operating states, and the additional data.

2. The radio device according to claim 1, wherein the wireless link has channel coding that is suitable for error-free transmission.

3. The radio device according to claim 1, wherein transmission of the operating function data and information data on the wireless link (3) takes place according to a transmission protocol that provides data security.

4. The radio device according to claim 1, wherein the operating functions, the operating states, and the additional data, which are transmitted via the wireless link, are encoded to prevent interception.

5. The radio device according to claim 1, wherein the radio device is connected by a cable to a stationary or semi-mobile remote control device that includes a second remote control interface, and wherein the mobile remote control device is connected by a wireless link to the second remote control interface of the stationary or semi-mobile remote control device for transmitting and receiving.

6. The radio device according to claim 1, wherein the mobile remote control device is designed as a battery-powered hand-held device, which permits free mobility of the user.

7. A mobile remote control device comprising:

a receiver for receiving at least an operating state data via a direct secured wireless link from a remote device for monitoring an operating state of the remote device;

a transmitter for transmitting at least operating data and user data via the direct secured wireless link to the remote device, the operating data providing for remote control of the remote device;

a display for displaying at least the operating state of the remote device; and an operating field for enabling a user to enter the operating data for remote control of the remote device.

8. The mobile remote control device according to claim 7, further comprising an information interface for providing the transmitter with the user data.

9. The mobile remote control device according to claim 7, wherein the user data is speech data or digital data.

10. The mobile remote control device according to claim 7, wherein the direct secured wireless link is shortwave or infrared.

11. The mobile remote control device according to claim 7, wherein the mobile remote control device and the remote device encode the operating state data, the operating data, and the user data prior to transmission by an encoder.

12. The mobile remote control device according to claim 7, wherein the mobile remote control device is handheld.

13. The mobile remote control device according to claim 7, wherein the remote device transmits via the direct secured wireless link additional user data to the mobile remote control device.

14. A communication system comprising:

a mobile remote control device having a transmitter and receiver; and a remote device for transmitting and receiving to the mobile remote control device via a direct secured wireless link, wherein the mobile remote control device receives operating state data indicating an operating state of the remote device and transmits operating data and user data via the direct secured wireless link to the remote device, the operating data enabling remote control of the remote device, and wherein the remote device transmits additional user data and the operating state data to the mobile remote control device, the operating state data providing information for monitoring an operating state of the remote device.

\* \* \* \* \*